Sept. 24, 1929.   H. R. BARTELL   1,729,434
ENGINE TRUCK
Filed May 12, 1927   3 Sheets-Sheet 2
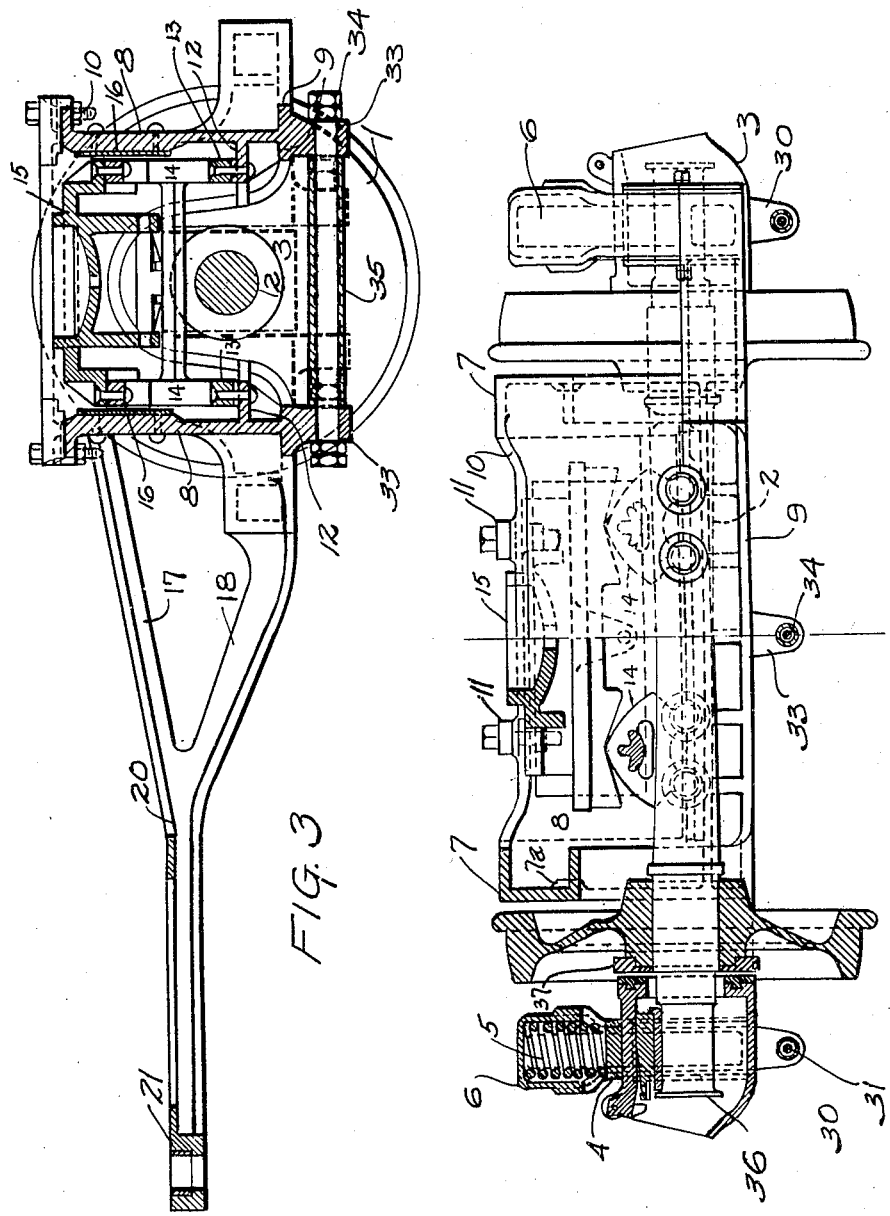
Inventor
Harry R. Bartell
By Cornwall, Bedell & James
Att'ys.

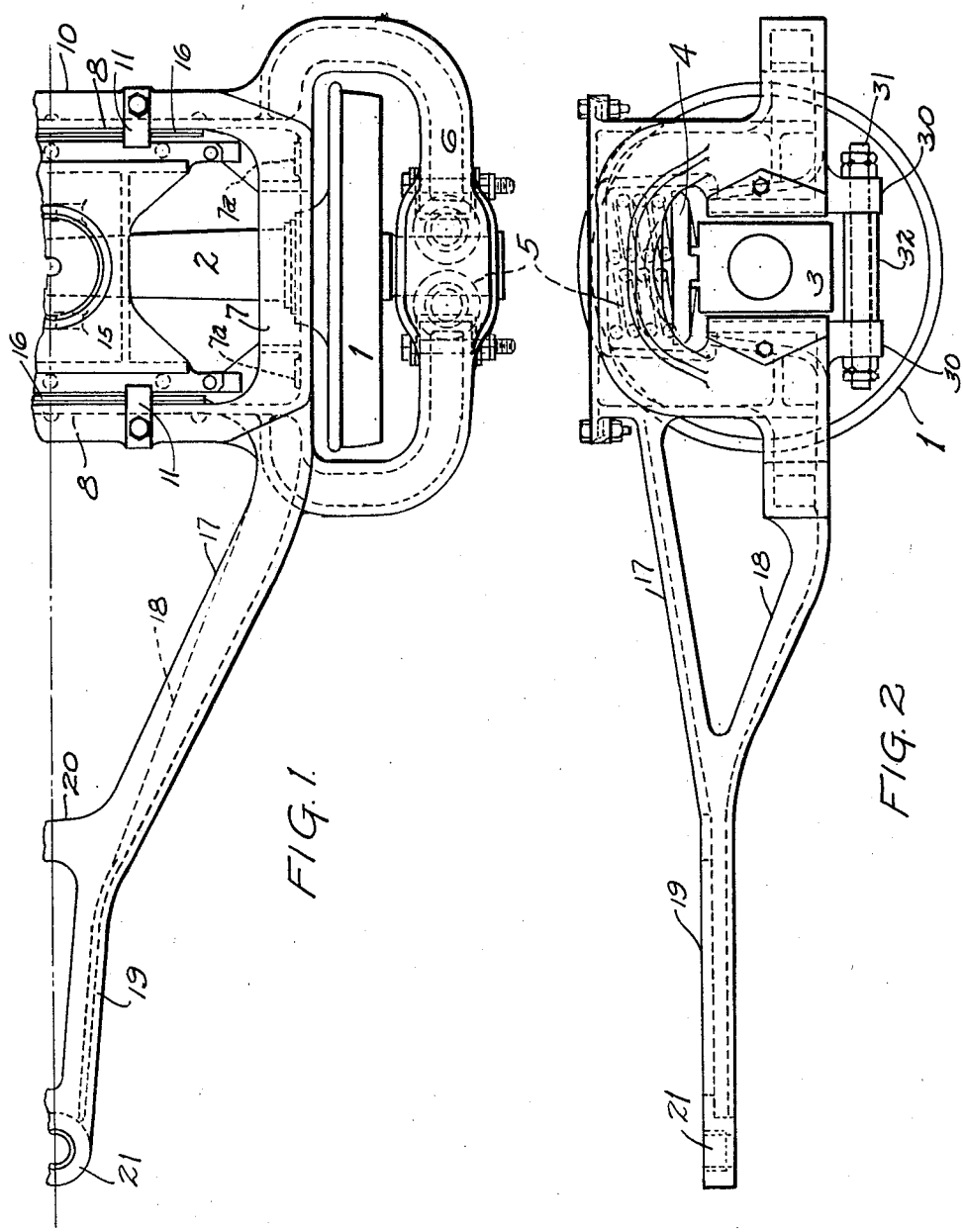

Sept. 24, 1929.   H. R. BARTELL   1,729,434
ENGINE TRUCK
Filed May 12, 1927   3 Sheets-Sheet 3
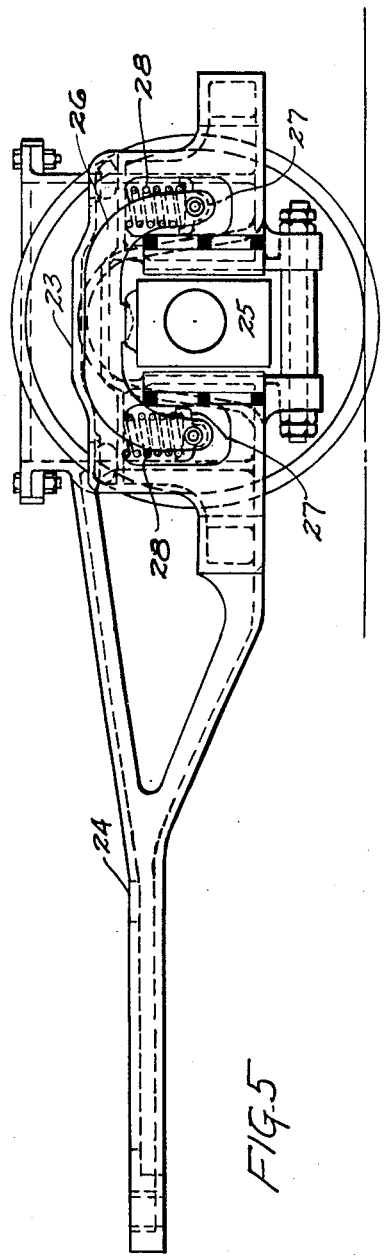
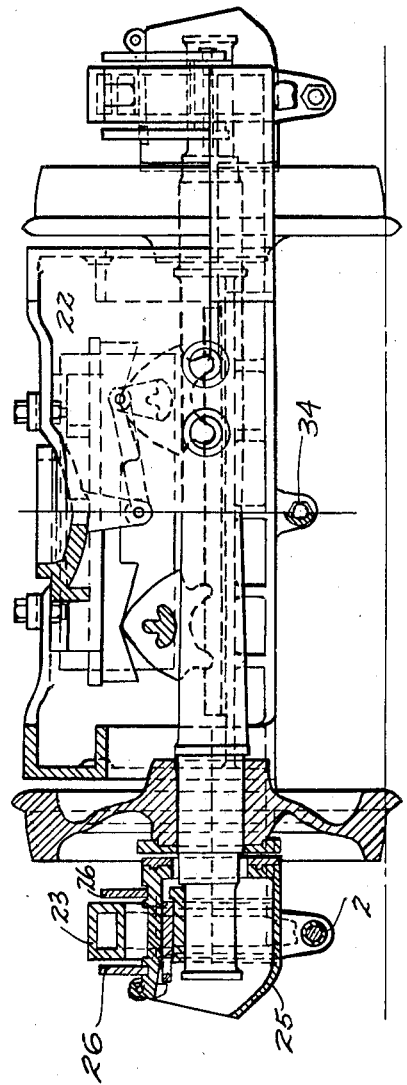

Patented Sept. 24, 1929

1,729,434

UNITED STATES PATENT OFFICE

HARRY ROBERT BARTELL, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

ENGINE TRUCK

Application filed May 12, 1927. Serial No. 190,853.

My invention relates to railway rolling stock and consists in an improved two-wheel truck especially adapted for use in locomotives.

One of the objects of my invention is to provide an improved one-piece truck frame having outside bearings and provided with suitable vertical and lateral supports for truck rocker and bolster elements. By outside bearings I refer to a structure in which the journals and journal boxes are located outside of the wheels and therefore support the truck frame outside of the wheels. This arrangement provides greater space between the wheels for the bolster supporting elements.

Another object of my invention is to provide an engine truck frame having an integral radius bar for pivotally connecting the truck to the underframe.

Another object of my invention is to provide a low mounting of the truck frame outside of the wheels which, among other advantages, provides maximum clearance for the locomotive piston when the same is applied to or removed from the cylinder.

Another object of my invention is to make the bolster supporting portion of the truck more rigid by tying the transoms of the truck to each other intermediate the wheels.

Other detailed objects of my invention are stated below and are attained by the structure described and illustrated in the accompanying drawings, in which—

Figure 1 is a one-half longitudinal top view of one form of my improved truck.

Figure 2 is a side elevation of the same truck.

Figure 3 is a vertical section on the longitudinal center line of the same truck.

Figure 4 is in part an end elevation of the same truck and in part a vertical transverse section on the center line thereof.

Figure 5 is a side elevation of another form of my improved truck.

Figure 6 is in part an end view and in part a vertical transverse section on the center line of the truck shown in Figure 5.

Referring first to Figures 1 to 4, inclusive, the truck structure includes wheels 1, axle 2, and journal boxes 3. A suitable spring seat 4 on each journal box supports spaced coil springs 5 which carry the truck frame. The latter includes wheel pieces 6 each forming a pedestal for its journal box and forming a housing for its supporting springs and extending longitudinally of the truck abreast of the wheel. The frame makes a return bend around the wheel from the ends of the wheel pieces as best shown in Figure 1, to form inside frame members or wheel pieces 7. These inside members are connected to each other by transoms 8 formed integrally with members 7. The major portion of each transom 8 comprises a vertical wall which is provided with suitable flanges 9 and 10 for reinforcing purposes and for the attachment of suitable clips 11 which prevent disassembly of the truck frame and the bolster carried thereby.

Each wall 8 is also provided with an inwardly extending flange 12 for supporting a rocker bearing 13 for the rockers 14, which provide bolster supports spaced transversely of the truck. The bolster 15 through its center plate provides a single support for the locomotive underframe. The vertical wall of each transom 8 forms a stop or guide for the rockers 14 and is high enough to not only engage the adjacent rockers throughout their depth but also to engage the edge of the bolster 15. Preferably a renewable chafing plate 16 is applied to the inner face of the transom.

The flanges 12 extend substantially from end to end of the transoms and because of this feature and the mounting of the frame on outside journal boxes, it is possible to use spaced rockers with ample clearance between them which is difficult or impossible where the axle bearings are on the inside of the truck wheels. This structure also makes possible greater lateral movement of the bolster than could exist under the limitations of an inside bearing structure. The pads 7ª on the inside of the vertical wall of each member 7 form stops for limiting the lateral movement of the bolster.

The lower ends of the pedestal legs formed on the outer wheel pieces terminate in lugs 30 and these lugs are tied together by a suitable bolt 31 which is surrounded between the lugs, by a spacing sleeve 32. The distance between the lugs 30 on one pedestal and the corresponding lugs on the other pedestal is so great that it is desirable to provide an intermediate tie for the frame and this is done by forming lugs 33 on the bottoms of transoms 8 near the center of the latter and the lugs 33 are tied together with a bolt 34 surrounded by sleeve 35.

Preferably a radius bar is formed integrally with the remainder of the truck frame and includes inclined elements 17 and 18 extending from the upper and lower portions of each side of the frame and inclined toward each other and toward the corresponding elements on the opposite side of the frame. Each pair of elements 17 and 18 merge in the horizontal arm element 19 and the opposite elements 19 are braced by cross piece 20 and at their ends unite in the bearing element 21 by which the truck is pivotally connected to the locomotive frame.

In the truck illustrated in Figures 5 and 6, the integral formation of the transoms 22, wheel pieces 23, and radius bar 24 is retained but the mounting of the truck frame on the journal boxes 25 differs from that previously described. In this truck, each journal box carries a pair of equalizers 26, the ends of which turn downwardly and adjacent to the sides of the box carry spring seats 27. This arrangement makes possible the location of springs 28 at a much lower level than those springs which are carried on top of the journal boxes. Hence the portion of the wheel piece 23 which extends over the journal box may be located at a lower level. This portion of the wheel piece may be box-shaped in cross section to provide greater strength for a shallow section.

The portion of the frame between the wheels may be the same as in the truck previously described and the description of details need not be repeated.

With the construction described, I attain the objects and advantages previously referred to, and I point out that with this type of truck the journals are easily inspected and lubricated and it is possible to use a standard car or tender axle. In addition to this, a smaller journal can be used for a given load than with inside bearings as inside journals are generally recognized as being only about three-fifths as efficient as outside journals. Another advantage of this structure is that the outside journal permits the use of collars 36 on the end of the journal to take some of the lateral thrust, thereby assisting the hub liners 37.

My one-piece structure eliminates the necessity of clearances for necessary rivets or bolts, as would be required in a built-up frame, and a given strength may be obtained with a minimum amount of material. Weakening of the truck structure or play of its parts due to the loosening or stretching of securing elements is eliminated with the one-piece frame, and all of the above-mentioned advantages are retained, although the shape and structure of the frame be varied substantially from the particular form illustrated.

I contemplate the exclusive use of all the modifications of my invention as come within the scope of my claims.

I claim:

1. In a railway two wheel truck frame casting, a longitudinal frame member arched to receive the truck axle, and integral elements extending from the upper and lower portions of said member and merging to form a radius bar for attaching the truck frame to the vehicle underframe.

2. In a railway two wheel truck frame casting, a longitudinal frame member arched to receive the truck axle, inside of the truck wheel, a wheel piece extending outwardly from the ends of said member and forming a pedestal and spring housing for an outside journal bearing, and elements extending from the upper and lower portions of said member and wheel piece and merging to form a radius bar for attaching the truck frame to the vehicle underframe.

3. In a railway two wheel truck frame, wheel pieces for outside bearings, inside frame members paralleling said wheel pieces, and transverse transoms each having bearing seats for a plurality of rockers located between said members.

4. In a two wheel railway truck, wheel pieces for slidably receiving outside bearings, inside frame members paralleling said wheel pieces, said wheel pieces and members being arched to receive the truck axle, and transoms between said members with their upper edges located substantially at the level of the tops of said inside frame members.

5. In a two wheel railway truck, wheels, an axle, journal boxes on the ends of said axle, a frame having vertical walls extending between said wheels, integral flanges on said walls, and integral extensions on the lower end portions of said walls projecting laterally of the truck beyond said walls, integral upwardly arched members connecting the outer ends of said extensions and forming pedestals for said journal boxes, rockers supported on said flanges, a bolster carried on said rockers, said walls extending upwardly to engage said bolster to prevent its movement longitudinally of the truck.

6. In a railway two wheel truck, wheels, an axle mounted thereon, journal boxes on the ends of said axle, springs supported on said journal boxes and spaced longitudinally of the truck, a frame having wheel pieces forming truck pedestals and housings for said springs, inside frame members paralleling said wheel pieces, and transverse walls connecting said members, flanges on said walls, rockers supported on said flanges, said walls extending upwardly to engage said rockers to guide the same and prevent their movement longitudinally of the truck.

7. In a two wheel railway truck, wheels, an axle with outside journals, a one-piece truck frame having wheel pieces supported on said journals, inside longitudinal members spaced from said wheel pieces, transoms extending between said wheel members and a flange on each of said transoms; a pair of rockers carried by each of said flanges, and a bolster supported by said rockers at points spaced transversely of the truck.

8. In a two wheel railway truck frame, outside wheel pieces provided with pedestal legs, transverse transoms connecting said wheel pieces, tie bars connecting the lower ends of the legs on each pedestal, and a tie bar connecting the lower portions of said transoms intermediate said wheel pieces.

9. In a two wheel railway truck frame, wheel pieces, transoms connecting said wheel pieces, rocker bearings on said transoms, and a tie bar connecting said transoms intermediate said bearings.

10. In a two wheel railway truck, wheels, an axle with outside journals, journal boxes thereon, equalizers on said journal boxes, springs carried by said equalizers at the sides of said boxes, and a truck frame with outside wheel pieces mounted on said springs.

11. In a two wheel railway truck, wheels, an axle with outside journals, journal boxes thereon, equalizers on said journal boxes, springs carried by said equalizers at the sides of said boxes, and a truck frame with outside wheel pieces of box-shape cross section mounted on said springs and extending over said journal boxes below the level of the tops of said wheels.

12. In a two wheel truck, wheels, an axle with journals outside of said wheels, journal boxes, equalizers mounted on said journal boxes and depending at the sides thereof, springs carried by the depending portions of said equalizers, and a truck frame with wheel pieces extending above and below said springs and carried by the same and extending over said journal boxes.

13. In a two wheel truck, wheels, an axle with journals outside of said wheels, journal boxes, equalizers mounted on said journal boxes and depending at the sides thereof, springs carried by the depending portions of said equalizers, and a one-piece cast truck frame having wheel pieces of box-shape cross section extending over said journal boxes below the level of the tops of said wheels.

14. In a two wheel truck, wheels, an axle with journals outside of said wheels, journal boxes, equalizers mounted on said journal boxes and depending at the sides thereof, springs carried by the depending portions of said equalizers, a one-piece cast truck frame having wheel pieces of box-shape cross section extending over said journal boxes below the level of the tops of said wheels, and pedestal legs formed integrally with said wheel pieces and located between said springs and said journal boxes.

15. In a two wheel railway truck, wheels, an axle with outside journals and boxes, inside frame members arched to accommodate said axle, transoms connecting said frame members and extending upwardly to the level of the tops of the latter, outside wheel pieces extending over said journal boxes below the level of the tops of said frame members, and spring supports for said wheel pieces on said journal boxes.

16. In a truck, an axle and wheels, a one piece truck frame comprising a longitudinal inner frame member and an outer wheel piece, on each side of the frame, adapted to receive one of said wheels between them, said frame members being located approximately at the level of the top of said wheels, and elements extending forward from each of said members and wheel pieces and uniting to form a radius bar arm.

17. A one piece truck frame comprising wheel pieces, transom walls connecting said wheel pieces and spaced apart so as to receive an axle and rocker bearings between them, rocker seats and guides on the inner faces of said walls, and members extending from said wheel pieces at the levels of the top and bottom of said transom walls and merging to form a radius bar.

18. A one piece truck frame comprising wheel pieces having recesses for slidably receiving journal boxes, longitudinal inner frame members, transom walls connecting said frame members and spaced from each other to receive a bolster between them, and members extending from said frame members at the level of the top of said transverse walls and from said wheel pieces and merging to form a radius bar arm.

19. A one piece truck frame comprising inner and outer longitudinal members at each side for receiving a truck wheel therebetween, and individual elements extending from different levels on said members and merging to form a radius bar arm.

In testimony whereof I hereunto affix my signature this 28 day of April, 1927.

HARRY ROBERT BARTELL.